United States Patent [19]
Ohta

[11] Patent Number: 5,780,129
[45] Date of Patent: Jul. 14, 1998

[54] MULTI-LAYER BLOW-MOLDED ARTICLE

[75] Inventor: Akira Ohta, Ichihara, Japan

[73] Assignees: Nippon Steel Chemical Co., Ltd.; Nippon Steel Corporation, both of Tokyo, Japan

[21] Appl. No.: 669,346

[22] PCT Filed: Jan. 11, 1995

[86] PCT No.: PCT/JP95/00015

§ 371 Date: Jun. 28, 1996

§ 102(e) Date: Jun. 28, 1996

[87] PCT Pub. No.: WO95/18712

PCT Pub. Date: Jul. 13, 1995

[30] Foreign Application Priority Data

Jan. 11, 1994 [JP] Japan ............................. 6-001379

[51] Int. Cl.$^6$ .......................... B60R 19/02; B32B 7/02; B32B 7/04
[52] U.S. Cl. .......................... 428/35.7; 428/34.9; 428/212; 264/510; 264/512; 293/102; 293/110; 293/120
[58] Field of Search ........................ 428/35.7, 34.9, 428/212; 293/102, 110, 120; 264/510, 512

[56] References Cited

U.S. PATENT DOCUMENTS

| | | | |
|---|---|---|---|
| 3,798,103 | 3/1997 | Gaunt | 156/244.24 |
| 4,870,736 | 10/1989 | Kacalieff | 29/894.31 |

FOREIGN PATENT DOCUMENTS

| | | |
|---|---|---|
| 561785644 | 6/1981 | European Pat. Off. . |
| 0 182 094 | 5/1986 | European Pat. Off. . |
| 0 549 353 | 6/1993 | European Pat. Off. . |
| 52-37026 | 9/1977 | Japan . |
| 57-63175 | 11/1982 | Japan . |
| 2-88214 | 3/1990 | Japan . |
| 4-14427 | 1/1992 | Japan . |
| 5-69452 | 3/1993 | Japan . |
| 6-182863 | 7/1994 | Japan . |
| 6-247237 | 9/1994 | Japan . |
| WO 95/02498 | 1/1995 | WIPO . |

*Primary Examiner*—Rena L. Dye
*Attorney, Agent, or Firm*—Darby & Darby

[57] ABSTRACT

There is provided a multi-layer blow-molded article wherein in a multi-layer marginal-wall region formed of a plurality of layers, a convexly crooked portion projecting generally convexly from inside to outside is so formed that the molding shrinkage factor of a resin for use in a more outer layer is larger than that of a resin for use in a more inner layer, and a concavely crooked portion denting generally concavely from outside to inside is so formed that the molding shrinkage factor of a resin for use in a more outer layer is smaller than that of a resin for use in a more inner layer; and all the layers of the molded article are fittingly secured to each other by means of a clamping force resulting from the difference in molding shrinkage factors of the resins constituting the layers and/or portions defined in a circumferential direction in the multi-layer marginal-wall region.

11 Claims, 8 Drawing Sheets

MULTI-LAYER BLOW-MOLDED ARTICLE

TECHNICAL FIELD

The present invention relates to a multi-layer blow-molded article having hollow structure made by a blow molding technique using a plurality of thermoplastic resins as raw materials.

BACKGROUND ART

Various techniques are known by which multi-layer, hollow-structure molded articles are made of a plurality of thermoplastic resins of raw materials. Needless to say, the primary object of making multi-layer molded articles is generally to provide an article having different features of individual materials. For example, this means to provide a molded article which is outstanding in both physical properties A and B by means of laminating a resin (a) that is superior in property A but is inferior in property B, and a resin (b) that is superior in property B but is inferior in property A.

In order to cope with such requirements, multi-layer blow-molding techniques have been developed. For example, much attention has been focused on, especially automobile fuel tanks as large industrial parts. Many proposals have been made on methods and machines for producing them as in Japanese Patent Publication Nos. 52-37026 (1977) and 57-53175 (1982). At present, multilayer blow-molded fuel tanks as products come into actual use in some automobiles. Other examples of the multi-layer blow-molded articles are containers for mayonnaise and ketchup consumed in general homes. In the production of such containers, a parison is formed in such a manner that a plurality of resin layers are positioned concentrically and that each layer has a generally equal thickness over its entire circumference.

Also known are multi-layer blow-molded articles made of parisons each of which has the different number and thickness of layers partially. For example, Japanese Patent Laid-open No. 2-88214 (1990) discloses a multi-layer blow-molded plastic article made of a multi-layer parison in which a-part of the parison is different in the number and thickness of layers from the other part of the parison. In the example of the patent, a trilayer parison is disclosed in which the outer layer is preferably made of a composition comprising crystalline polyolefin and engineering plastic or a thermoplastic, elastomeric, polyolefin composition, the intermediate layer is preferably a reprocessed-material layer comprising, e.g., flash formed in the production of multi-layer blow-molded articles and defective moldings or a foamed-material layer comprising polyolefin or the reprocessed material mentioned above, and the inner layer is preferably made of crystalline polyolefin.

In addition, Japanese Patent Laid-open No. 4-14427 (1992) discloses a method of producing multi-layer blow-molded articles using a parison in which approximately half of the parison in the circumferential direction is made of a material for reinforced portions and the remaining part is made of a material for external portions or approximately half of the parison in the circumferential direction is made of a material for reinforced portions and the remaining part is made of a laminate consisting of a material for reinforced portions and a material for external portions. However, in a multi-layer blow-molded article produced by such a method, the layers-are generally adhered to each other by means of adhesives or fusing so that the layers will not separate from each other.

In this respect, Japanese Patent Laid-open No. 2-88214 (1990), for example, discloses a multi-layer blow-molded article in which the outer layer is made of a composition comprising crystalline polyolefin and engineering plastic or a thermoplastic, elastomeric, polyolefin composition, the inner layer is made of crystalline polyolefin, and the intermediate layer is a reprocessed material comprising, e.g., flash formed in the production of the multi-layer blow-molded article itself and defective moldings or a foamed-material layer comprising polyolefin or the reprocessed material mentioned above, whereby there is provided affinity between the layers due to the common polyolefin component present in all the layers to obtain high interlaminar strength without using adhesives. In addition, Japanese Patent Laid-open No. 4-14427 (1992) teaches that when layers are not adhered to each other by fusing, the layers are integrated by means of adhesives, or the resins for use in the layers are modified so that the layers are adhered to each other by fusing. In the inventions disclosed in both patents, the layers are strongly adhered to each other by means of adhesives or fusing.

However, from the viewpoint of resource conservation and control of global environmental pollution which may be caused due to molded synthetic-resin articles being disposed, the need for recycling or reuse of molded synthetic-resin articles is now increasing. Thus, the requirement for recycling or reuse of the resins used for molded multi-layer, hollow-structure articles mentioned above is also increasing. However, when the layers each consisting of diverse resins are ground and granulated together, the resultant reprocessed resin is far from providing the features of the individual resins. It rarely provides even the average feature of the individual resins and generally becomes a low-grade resin losing all the features of the resins.

Therefore, in order to recycle or reuse such multi-layer, hollow-structure molded articles, the layers each consisting of diverse resins are required to be separated from each other. However, once the layers have been adhered to each other, it becomes difficult to make them separate. Furthermore, to make them separate mechanically or chemically, expensive equipment would be needed. However, to invest in such equipment for recycling or reuse may be commercially unprofitable and be unfeasible in many cases. In this respect, proposed is a method of making layers consisting of diverse resins easily separate from each other, whereby resins in each layer of multi-layer molded articles are separated into the individual types of resins for recycling.

For example, Japanese Patent Laid-open No. 5-069452 (1993) discloses an injection-molded automobile bumper in which a sheet of resin that is not adhesive to the resin of the main body of the bumper is used. The non-adhesive resin sheet is molded into a resin sheet of a desired shape conformed to the front portion of the bumper. This molded sheet is attached to the mold of an injection molding machine and a resin is then injected into the back surface of the molded sheet to form the main body of the bumper, whereby the molded sheet and the main body of the bumper are integrated. In an automotive bumper thus produced, the molded sheet and the main body of the bumper are not separated from each other under normal service conditions but are easily separated if force is exerted thereon.

However, in this case, just as in the case of a multi-layer laminated film, two steps are needed; one for molding a resin sheet first and one for attaching the resultant molded sheet to a mold, followed by injection molding the main body of a bumper. Furthermore, no proposal is made as to how to separate with exerting force the molded sheet and the main body of the bumper, both of which are not separated from each other under normal service conditions.

Accordingly, although conventional molded multi-layer articles have great value in their intended use, they present a difficult problem to be solved in view of recycling and reuse.

DISCLOSURE OF THE INVENTION

The present inventors have assiduously studied in order to develop such a multi-layer blow-molded article that the layers are strongly secured to each other without separating under normal service conditions and without losing the advantages of the multi-layer article and that the layers having diverse resins and/or portions defined in a circumferential direction can be easily separated from each other in recycling and reuse. As a result, the present inventors have found that the above-mentioned problem can be solved in such a way that all the layers of a multi-layer marginal-wall region in a hollow molded article are fittingly secured to each other by means of a clamping force resulting from the difference in molding shrinkage factors of the resins constituting the layers and/or portions defined in a circumferential direction in the multi-layer marginal-wall region. Thus, the present invention was completed.

Therefore, an object of the present invention is to provide such a multi-layer blow-molded article that the layers are strongly secured to each other without separating from each other under normal service conditions and without losing the advantages of the multi-layer molded article and that the layers and/or portions defined in a circumferential direction, both of which have diverse resins, can be easily separated from each other in recycling and reuse.

Thus, in accordance with a first aspect of the present invention, there is provided a multi-layer hollow blow-molded article comprising a plurality of thermoplastic resins each having different molding shrinkage factors; wherein, in a multi-layer marginal-wall region of the hollow molded article, convexly crooked portion(s) projecting generally convexly from inside to outside are so formed that the molding shrinkage factor of a resin for use in a more outer layer is larger than that of a resin for use in a more inner layer, and concavely crooked portion(s) denting generally concavely from outside to inside are so formed that the molding shrinkage factor of a resin for use in a more outer layer is smaller than that of a resin for use in a more inner layer; and all the layers of the molded article are fittingly secured to each other by means of a clamping force resulting from the difference in molding shrinkage factors of the resins constituting the layers and/or portions defined in a circumferential direction in the multi-layer marginal-wall region.

In a preferred aspect of the present invention, a multi-layer blow-molded article preferably comprises, in the marginal wall of the hollow molded article, a plurality of portions which are different in at least one of the type of resin, the number of layers and the thickness of a layer in the circumferential direction. In addition, it is preferred that basically the layers and portions defined in a circumferential direction, both of which have diverse resins, are not adhered to each other by means of adhesives or fusing, because those layers and portions, if so made, cannot be easily separated from each other in recycling or reuse. However, those layers and portions defined in a circumferential direction may be temporarily adhered to each other to such an extent that they can retain their proper positions.

In another preferred aspect of the present invention, convexly crooked portions and/or concavely crooked portions in the aforementioned multi-layer marginal-wall region may include clamping portions by which the layers are fittingly secured to each other to a larger extent in such a manner that in the convexly crooked portions, any one of more outer layers embraces any one of more inner layers and that in the concavely crooked portions, any one of more inner layers embraces any one of more outer layers.

In still another preferred aspect of the present invention, the outermost layer of the aforementioned hollow molded article comprises a plurality of portions having diverse resins and the portions comprise, at the boundaries, joining portions to be joined together extending outwards from the portions having diverse resins. These joining portions may be fixed by a suitable joining means so that the layers of the article can be fittingly secured to a lager extent. Examples of the joining means include a joining part such as a bolt/nut or clip and a joining structure such as a fastener or zipper fixed to or formed in the joining portions.

In accordance with a second aspect of the present invention, there is provided a multi-layer blow-molded article wherein the molded article is a molded multi-layer, hollow-structure molded article which comprises in combination a surface layer having a surface area of at least 50% of the entire surface area of the molded article and a hollow structure integrally joined to the back surface of the surface layer. The surface layer is made by an injection molding technique or vacuum forming technique, and the hollow structure is made by a blow molding technique; the molding shrinkage factor of a resin constituting the surface layer is larger than that of a resin constituting the hollow structure; both the left and right edges of the surface layer have clamping portions for clamping the hollow structure in such a manner that the surface layer embraces the hollow structure; and the surface layer is fittingly secured to the hollow structure on the basis of the difference between the molding shrinkage factor of the resin constituting the surface layer and that of the resin constituting the hollow structure. In an aspect of the invention, the clamping portions of the surface layer and the corresponding stepped portions of the hollow structure each include a plurality of marginal joining portions extending therefrom. The marginal joining portions of the clamping portions can be strongly secured to those of the stepped portions by using joining means. Furthermore, the surface layer may include a convex locking portion projecting inward from the inner surface thereof and the hollow structure may include a concave locking portion in a position corresponding to the convex locking portion of the surface layer. By locking the convex locking portion to the concave locking portion, the surface layer can be more strongly secured to the hollow structure. In this aspect of the present invention, one of the surface layer and the hollow structure may be molded first and then attached to a molding die for use in molding the other one. The latter one is then molded on the back surface of the former one, thereby integrating both of them to produce a molded article.

In accordance with a third aspect of the present invention, there is provided a multi-layer blow-molded article filled with a foamed resin inside the hollow molded article wherein the hollow molded article comprises a plurality of types of thermoplastic resins having different molding shrinkage factors in such a manner that the layers are not adhered to each other; the molding shrinkage factor to be inherent in a resin for use in a more outer layer is smaller than the molding shrinkage factor to be inherent in a resin for use in a more inner layer; and after the foaming resin has been filled, the overall dimensional shrinkage factor of the molded article is smaller than the molding shrinkage factors to be inherent in resins constituting the layers.

In this aspect of the invention, there may be provided, for example, a molding method comprising: using thermoplastic resins A and B having the molding shrinkage factors a and b respectively to blow mold a multi-layer parison having the resin A in the outer layer and the resin B in the inner layer, wherein a<b and resin A and B are not adhesive to each other; and while a molded article still residing in a mold is cooled, filling the internal space of the molded article with a foaming resin primarily comprising of a resin of the same type as that of the resin B for use in the inner layer to expand the foaming resin, whereby the molded article is cooled to be solid with keeping its expansion pressure toward the molded article in the mold. In the application of this method, the dimensional shrinkage factor p of the foamed-filler-containing molded article after released from the mold may be kept equal to or less than the molding shrinkage factor "a" of the resin A for use in the outer layer (p<a), whereby a multi-layer blow-molded article with a high degree of adherence is obtained, wherein the inner surface of the outer layer of the multi-layer molded article is not adhered chemically to the outer surface of the inner layer containing the foamed filler.

DESCRIPTION IS MADE MORE IN DETAIL BELOW.

Generally, thermoplastic resins have such a property that they shrink after molding. It is a phenomenon that the dimension of a molded article at the time when a set period of time has been elapsed after released from the mold becomes smaller than the corresponding dimension of a mold cavity. Because of this phenomenon, the molding shrinkage factor of a resin is herein defined as the ratio of a decrease in the dimension of the resin to the corresponding dimension of a mold cavity. The molding shrinkage factor is an inherent property in an individual type of resin. Therefore, it is natural that the molding shrinkage factors vary among types of resins. In the case of a multi-layer blow-molded article, it is uncertain which of the molding shrinkage factors of resins for use in the layers becomes predominant. Thus, the molding shrinkage factor is defined as distinguished from the dimensional shrinkage factor of a molded article itself.

In the present invention, an inner layer can be strongly clamped by an outer layer with the layers being fittingly in contact with each other on the basis of the difference in molding shrinkage factors of the layers. To be more specific, in generally convexly crooked portions, the inner layer comprises a resin A having a low molding shrinkage factor "a" and the outer layer comprises a resin B having a higher molding shrinkage factor "b" (a<b), whereby the dimensional shrinkage factor "q" of a resultant multi-layer blow-molded article is typically between a and b (a<q<b). In this case, the resin B for use in the outer layer can shrink more if it is present alone, but actually it shrinks with its shrinkage factor being nearly equal to q, because the inner layer having a low shrinkage factor prevents the outer layer from shrinking. On the contrary, the resin A for use in the inner layer is applied an external pressure due to the strong shrinkage force of the outer layer and, as a result, the resin A is forced to shrink with its shrinkage factor being nearly equal to "q" over its inherent molding shrinkage factor "a". Thus, there is provided an intended condition that the inner layer is strongly clamped by the outer layer.

In the first and second aspects of the present invention, a plurality of types of thermoplastic resins having different molding shrinkage factors are used to mold a hollow molded article. The difference between the molding shrinkage factors of the adjacent layers in the molded article is preferably 0.2% or more and more preferably 0.3% or more. In addition, preferably the difference between the molding shrinkage factors of an outer layer and an inner layer having an intermediate layer therebetween is 0.5% or more and preferably 0.8% or more. When the difference between the molding shrinkage factors of adjacent layers is 0.2% or more and the difference between an outer layer and an inner layer having an intermediate layer therebetween is 0.5% or more, in the multi-layer marginal-wall region of a hollow molded article, layers and portions defined in a circumferential direction may be secured to each other to the desired extent which varies in applications. Such resins may be easily selected, for example, on the basis of the molding shrinkage factors of the resins listed in Table 1.

TABLE 1

| Molding shrinkage factor | Thermoplastic Resins |
| --- | --- |
| 1.3% or more | [1] Polyolefin Resins (HM-HDPE, HDPE, MDPE, L-LDPE, LDPE, V-LDPE, PP)<br>[2] Elastomeric Polyolefin Resins (Elastomeric resins based on the aforementioned group of resins [1])<br>[3] PBT (Polybutylene terephthalate Resins) |
| 0.8% or more | [4] Filler-Reinforced-Polyolefin Resins (Resins of aforementioned group [1] reinforced with a filler)<br>[5] Polyamide Resins (PA6, PA66, PA6-10, PA6-12, PA11, PA12, PA46) |
| 0.8% or less | [6] PS (Polystyrene Resins), ABS (Acrylonitrile-Butadiene-Styrene Resins), AS (Acrylonitrile-Styrene Resins), Modified PPE (Modified-Polyphenylene ether Resins)<br>[7] Filler-Reinforced PBT Resins<br>[8] PSF (Polysulfone Resins), PES (Polyether sulfone Resins |
| 0.5% or less | [9] PC (Polycarbonate Resins), PET (Polyethylene terephthalate Resins), PPS (Polyphenylene sulfide Resins), PEI (Polyether imide Resins), PI (Polyimide Resins), PEEK (Polyether ether-ketone Resins), LCP (Liquid Crystal Polymer Resins)<br>[10] Filler-Reinforced Resins derived from the resins below (PA Resins, PS, ABS, AS, Modified PPE, PSF, PES, PC, PET, PPS, PEI, PI, PEEK, LCP)<br>[11] Polymer alloy Resins (Polymer alloy Resins derived from a plurality of species belonging to the aforementioned groups [3], [5], [6], [7], [8], [9] and [10]). |
| Fillers | Herein, fillers include glass fibers, glass beads, carbon fibers, calcium carbonate, talc, mica, blast-furnace slag, metallic powder, woodmeal and the like. |

In the production of the aforementioned multi-layer blow-molded articles of the present invention, it is preferred that a multi-layer parison to be formed has a generally equal thickness over the entire periphery thereof, but the present invention is not limited thereby. The occurrence of wrinkles and deformations in the multi-layer parison may be thus prevented when the multi-layer parison is extruded in the production of the multi-layer blow-molded article.

In the first and second aspects of the present invention, layers having diverse resins in the multi-layer marginal-wall region of a hollow molded article and portions defined in a circumferential direction are not adhered but fittingly secured to each other by means of a clamping force resulting from the difference in molding shrinkage factors of the resins constituting the layers in the multi-layer marginal-wall region and/or the portions defined in a circumferential direction. Thus, the layers and portions defined in a circumferential direction are strongly secured to each other without separating to keep the hollow molded article in a desired shape under normal service conditions. In addition, in recycling and reuse, the layers and/or portions defined in a circumferential direction, both of which have diverse resins, can be easily separated from each other, for example, by removing joining means such as bolts/nuts if desired, followed by pressing or twisting the hollow molded article to deform.

In the aforementioned first and second aspects of the present invention, a combination of resins has a limitation. To be more specific, there is a limitation that a resin for use in an outer layer should be larger in molding shrinkage factor than a resin for use in an inner layer. In the case where a resin for use in an outer layer is smaller in molding shrinkage factor than a resin for use in an inner layer, the inner layer separates from the outer layer in an initial stage so that a multi-layer molded article thus produced does not serve the purpose of the present invention. On the contrary, in the third aspect of the present invention, there is provided a multi-layer blow-molded article in which the inner layer is strongly clamped by the outerlayer to retain a high degree of adherence between the layers even in the case where a resin for use in an outer layer is smaller in molding shrinkage factor than a resin for use in an inner layer.

In the third aspect of the present invention, while a molded article shaped by a mold is still in the mold and is cooled, a foaming resin is filled into the internal space of the molded article to expand, then the molded article is cooled to be solid in the mold while being applied an internal pressure due to the expansion of the foamed resin, whereby the dimensional shrinkage factor "p" of the foamed-filler-containing molded article can be smaller than the inherent dimensional shrinkage factor "q" of a molded article without an expanded filler. By controlling the expanding process, the value "p" can be reduced to approximately one third of the value "q". Even if the molded article is a multi-layered one in which the molding shrinkage factor of a resin for use in the inner layer is larger than that of a resin for use in the outer layer, the dimensional shrinkage factor of the entire inner layer including a foamed material can be smaller than the molding shrinkage factor of the outer layer on the basis of a pressure due to the expansion of the foamed material.

In Table 2, listed are resins for use in an inner layer and foaming resins based on the same types of resins as the resins for use in an inner layer, which may be used according to the third aspect of the present invention. In Table 3, also listed are resins for use in an outer layer which may be used in combination with the resins for use in an inner layer listed in Table 2. In Table 4, listed are combinations which should be excluded from them because they are chemically adhered to each other.

TABLE 2

| Molding shrinkage factor | Resins for Use in Inner Layer | Foaming Resins |
|---|---|---|
| 1.3% or more | [1] PE (Polyethylene) Resins HM-HDPE, HDPE, MDPE, LDPE, L-LDPE, V-LDPE [2] Elastomeric Polyethylene Resins Elastomeric Resins based on the resins of the group [1] mentioned above [3] Filler-Reinforced PE Resins Resins of above-mentioned group [1] reinforced a filler | Foaming PE Resins |
| 0.8% or more | | |
| 1.3% or more | [4] PP (Polypropylene) Resins [5] Elastomeric PP Resins | Foaming PP Resins |
| 0.8% or more | [6] Filler-Reinforced PP Resins | |
| 0.8% or less | [7] PS (Polystyrene) Resins [8] Elastomeric PS Resins | Foaming PS Resins |
| | [9] ABS Resins [10] Filler-Reinforced ABS Resins | Foaming ABS Resins |

TABLE 3

| Molding shrinkage factor | Resins for Use in Outer Layer |
|---|---|
| 1.3% or more | [11] PBT (Polybutylene terephthalate Resins) |
| 0.8% or more | [12] Polyamide Resins PA6, PA66, PA6-10, PA6-12, PA11, PA12, PA46 |
| 0.8% or less | [13] PS (Polystyrene Resins), ABS (Acrylonitrile-Butadiene-Styrene Resins), AS (Acrylonitrile-Styrene Resins), Modified PPE (Modified-Polyphenylene ether Resins) [14] Filler-Reinforced PBT Resins [15] PSF (Polysulfone Resins), PES (Polyether sulfone Resins) |
| 0.5% or less | [16] PC (Polycarbonate Resins), PET (Polyethylene terephthalate Resins), PPS (Polyphenylene sulfide Resins), PEI (Polyether imide Resins), PI (Polyimide Resins), PEEK (Polyether ether ketone Resins), LCP (Liquid Crystal Polymer Resins) [17] Filler-Reinforced Resins below PA Resins, PS, ABS, AS, Modified PPE, PSF, PES, PC, PET, PPS, PEI, PI, PEEK, LCP [18] Polymer alloy Resins (Polymer alloy Resins derived from a plurality of species belonging to the aforementioned groups [11], [12], [13], [14], [15], [16] and [17]). |

TABLE 4

| Resins for Use in Inner Layer | Resins for Use in Outer layer |
|---|---|
| PS Resins and Filler-Reinforced PS Resins | Modified PPE Resins and Filler-Reinforced Modified PPE Resins |
| ABS Resins and Filler-Reinforced ABS Resins | PC and Filler-Reinforced PC Resins |

The term 'filler' used in Tables 2, 3, and 4 has the same meaning as that used in Table 1. When a multi-layer blow-molded article in the third aspect of the present invention is a trilayered one. any resin which does not adhere chemically to a resin to be used in the outer layer of the molded article may be selected from the resins listed in Table 3 as a resin for use in the intermediate layer. Preferably, a foaming resin and a resin constituting an inner layer are of the same type. When a foaming resin and a resin for use in an inner layer are of the same type, they may easily separate from a resin for use in an outer layer after use, which is preferred from the viewpoint of recycling.

In a multi-layer blow-molded, foamed-filler-containing article produced in such a way as described above, the innermost layer containing the foaming material is clamped by the outermost layer in such a manner that the outermost layer embraces the inner layer and a high degree of adherence between the layers is maintained so that the layers may not separate from each other while the molded article is used for its intended purpose. In addition, the layers are not adhered to each other. Therefore, each layer can be separated successively beginning with the outer layer. Thus, all the resin-containing layers can be separated from each other with ease and without damaging the resins.

BEST MODE FOR CARRYING OUT THE INVENTION

Hereinafter, the present invention will be more particularly described with reference to the accompanying drawings.

EXAMPLE 1

Figure 1:
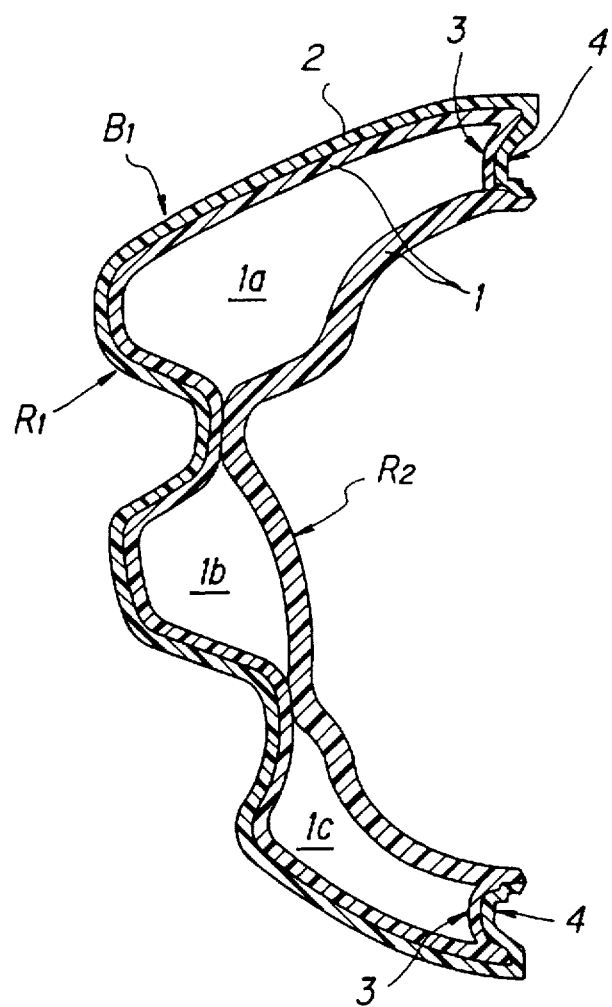
FIG. 1 is a sectional view of an automobile bumper which is a multi-layer blow-molded article in Example 1 of the present invention.

FIG. 1 shows a sectional view of an automobile bumper $B_1$, which is a multi-layer blow-molded article in Example 1 of the present invention. The bumper $B_1$ comprises a main bumper body 1 which is made of a glass-reinforced ABS resin of a molding shrinkage factor of approximately 0.5% and a surface portion 2 which is made of an olefinic elastomer resin of a molding shrinkage factor of approximately 1.8%. The main body has hollow portions $1a$, $1b$ and $1c$ which each correspond to an upper portion, an intermediate portion and a lower portion, respectively. The surface portion 2 is molded integrally on the front side of the main bumper body 1 and its front marginal-wall portion provides a multi-layer marginal-wall region which has two layers containing two types of resins.

In the bumper $B_1$, of Example 1, the front marginal-wall portion is a convexly crooked portion $R_1$ projecting outward generally convexly and the rear marginal-wall portion is a concavely crooked portion $R_2$, denting inward generally concavely. The boundaries between the convexly crooked portion $R_1$ and the concavely crooked portion $R_2$ of the bumper $B_1$ have clamping portion 3 in the main bumper body 1 and clamping portions 4 in the surface portion 2, so that the upper and lower edges of the surface portion 2 embrace the upper and lower edges of the main bumper body 1 to clamp.

In Example 1, the main bumper body 1 and the surface portion 2 both constituting the multi-layer marginal-wall region of the bumper $B_1$ are secured to each other by the clamping force on the basis of the difference (approximately 1.3%) between the molding shrinkage factor (approximately 0.5%) of the glass-reinforced ABS resin which has a low molding shrinkage factor and constitutes the main bumper body 1 and the molding shrinkage factor (approximately 1.8%) of the olefinic elastomer resin which has a large molding shrinkage factor and constitutes the surface portion 2, in such a manner that the clamping portions 3 of the main bumper body 1 is clamped by the clamping portions 4 of the surface portion 2 with the former ones fitting the latter ones. In this case, those clamping portions 3 and 4 are not secured to each other by means of adhesives or fusing. The bumper $B_1$ of Example 1 has a equal thickness over approximately the entire periphery in a circumferential direction except near the clamping portions 3 and 4 to which force is applied in molding.

Therefore, the automobile bumper $B_1$ of Example 1 has an advantage that while the bumper $B_1$ is attached to a car body and its intended shape is maintained, the surface portion 2 is fittingly and strongly secured to the main bumper body 1 by means of a clamping force resulting from the difference in molding shrinkage factor between the resin constituting the main bumper body 1 and the resin constituting the surface portion 2 and when the bumper $B_1$ is removed from the car body to be disposed of, the surface portion 2 may be easily removed from the main bumper body 1 by applying pressure or twist to the bumper $B_1$ to deform or partially destroy, so that the main bumper body 1 and the surface portion 2 can be treated separately.

A multi-layer blow-molding method of producing the automobile bumper $B_1$ of Example 1 will be described with reference to FIGS. 2-6.

Figure 2:
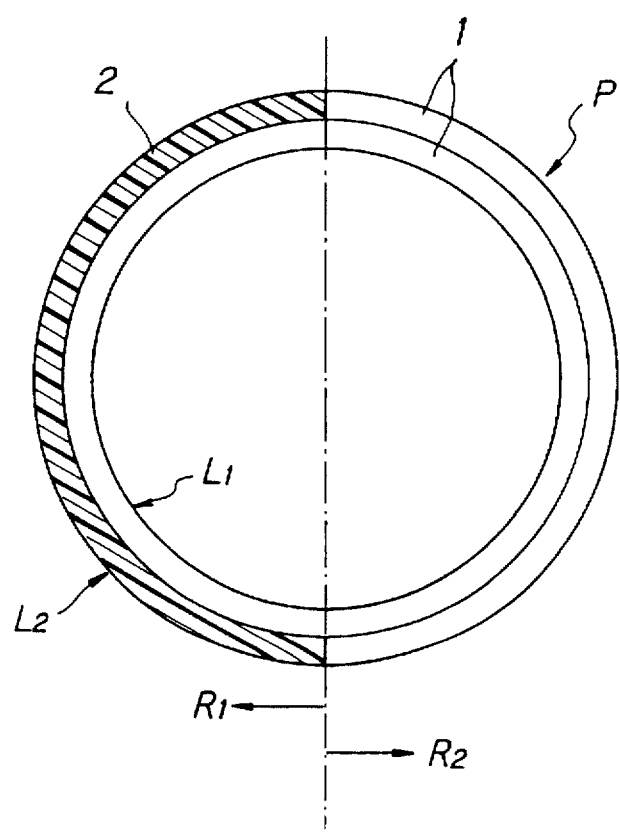
FIG. 2 is a sectional view of a multi-layer parison extruded for the multi-layer blow molding of the bumper shown in FIG. 1.
Figure 3:
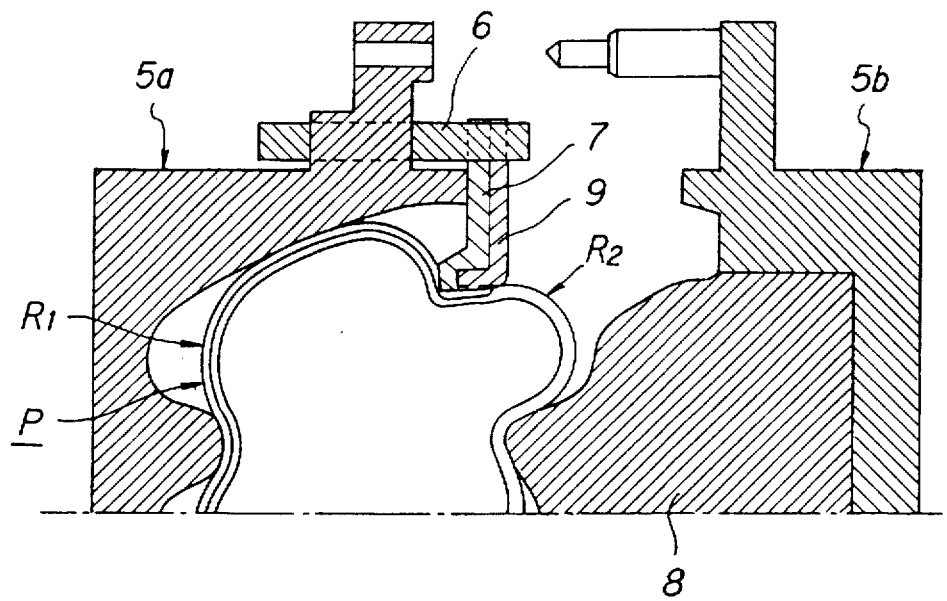
FIG. 3 is a sectional view of an upper half of a mold, which shows a mold clamping operation in blow-molding the bumper in the mold using the parison.
Figure 4:
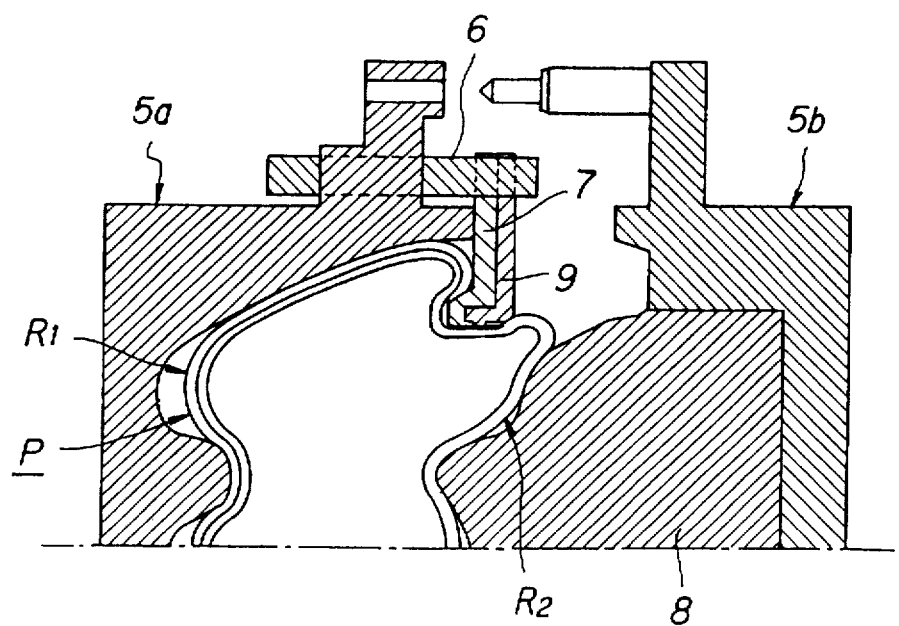
FIG. 4 is a sectional view of the same upper half of the mold as the one in FIG. 3.
Figure 5:
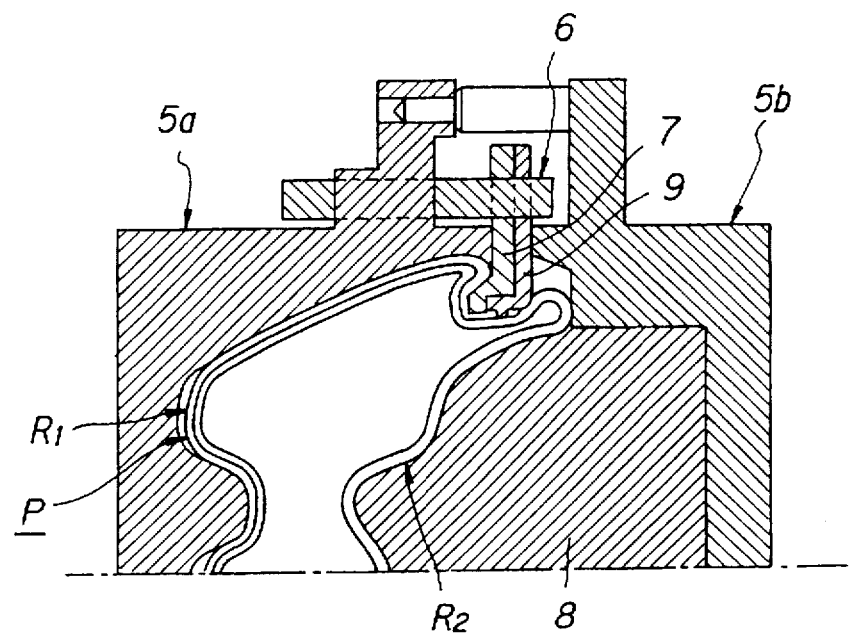
FIG. 5 is a sectional view of the same upper half of the mold as the one in FIG. 3.
Figure 6:
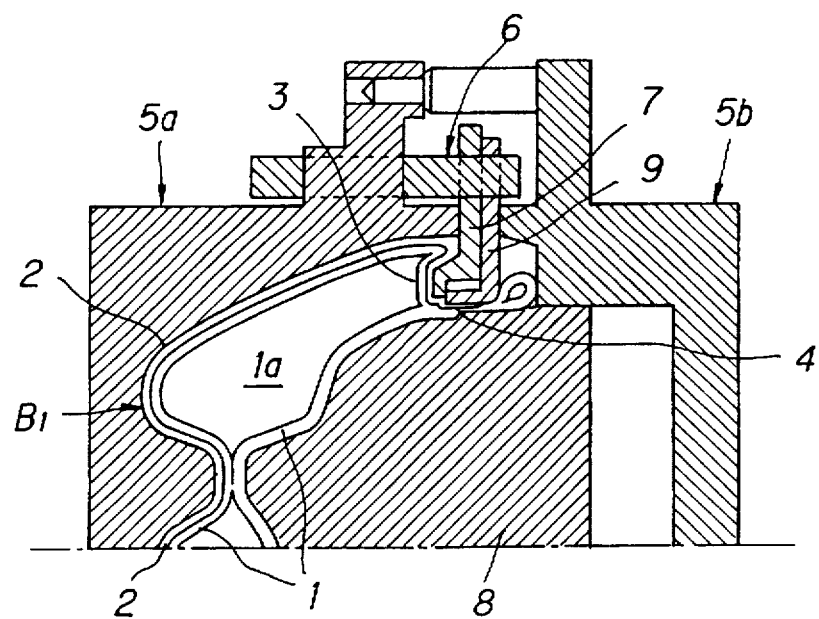
FIG. 6 is a sectional view of the same upper half of the mold as the one in FIG. 3.

Referring to FIG. 2, there is shown a multi-layer parison P for molding the bumper $B_1$ by a multi-layer blow-molding method. In the multi-layer parison P, an inner layer $L_1$ and a region which comes to the concavely crooked portion $R_2$ in an outer layer $L_2$ is made of a glass-reinforced ABS resin constituting the main bumper body 1, a region which comes to the convexly crooked portion $R_1$ in the outer layer $L_2$ is made of an olefinic elastomer resin, and the parison P has a generally equal thickness over its entire prephery. As is shown in FIGS. 3-6, the parison P having a structure mentioned above, which has been extruded through extrusion equipment, is inserted between a pair of mold halves $5a$ and $5b$ which constitute a mold and then clamped therebetween with a first slide portion 7 of a slide piece mechanism 6 being moved rearward (see FIGS. 3, 4 and 5). A slide core 8 and a second slide portion 9 provided in the first slide portion 7 of the slide piece mechanism 6 is then slid with introducing compressed air into the multi-layer parison P by means of an air introducing mechanism (not shown). Finally, the clamping portions 3 and 4 is molded by compression at the boundaries between the convexly crooked portion $R_1$ and the concavely crooked portion $R_2$ on the basis of the cooperative operation which is performed with the first slide portion 7 of the slide piece mechanism 6, the slide core 8 and the second slide portion 9 (see FIG. 6).

EXAMPLE 2

Figure 7:
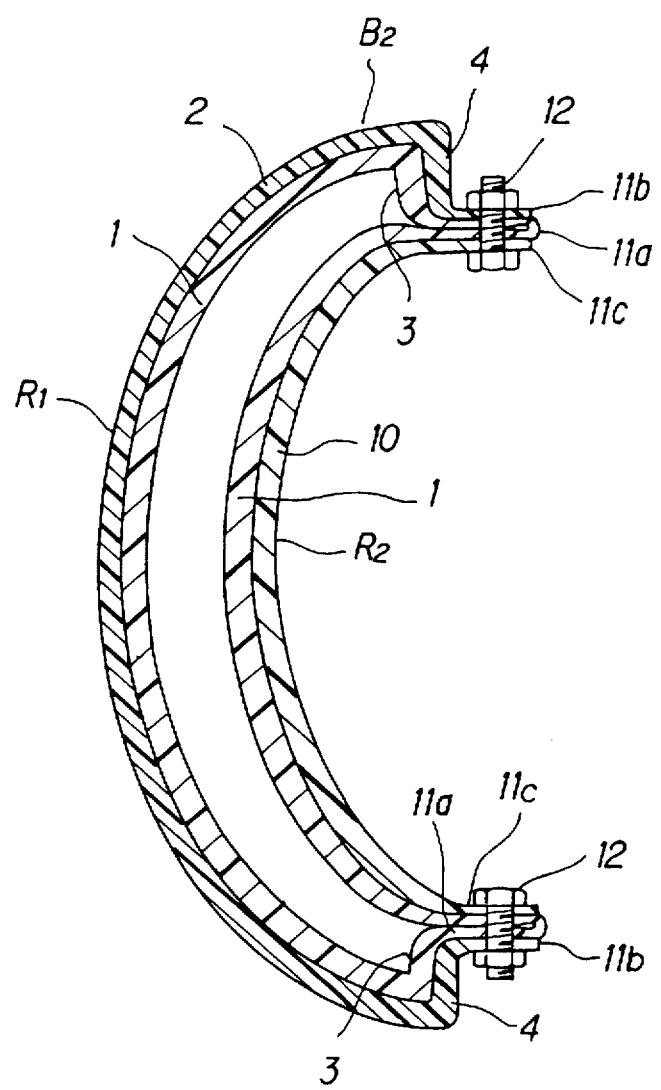
FIG. 7 is a sectional view of an automobile bumper which is a multi-layer blow-molded article in Example 2 of the present invention.

Referring to FIG. 7, there is shown a sectional view of the automobile bumper $B_2$ which is a multi-layer blow-molded article in Example 2 of the present invention. The bumper $B_2$ comprises a surface portions 2 molded integrally in the front portion of the main bumper body 1 which is hollow and a back surface portion 10 molded integrally in the rear portion of the main bumper body 1. The surface portion 2 is made of an olefinic elastomer resin of a molding shrinkage factor of approximately 1.8% and the back surface portion 10 is made of a glass-reinforced ABS resin of a molding shrinkage factor of approximately 0.5%. The main bumper body 1 is made of a mixed glass-reinforced ABS resin which is a blend of a reprocessed glass-reinforced ABS resin obtained in the recycling of the flash and defective moldings of the main bumper body 1 itself and the back surface portion, a virgin glass-reinforced ABS resin and the like and which has a molding shrinkage factor of approximately 0.8%. Therefore, the front and rear portions of the marginal wall each are formed into two layers of a different combination of two kinds of resins having different shrinkage factors to provide a multi-layer marginal-wall region.

In the bumper $B_2$ of Example 2, the front portion of the marginal wall makes up a convexly crooked portion $R_1$ projecting generally convexly from inside to outside and the rear portion of the marginal wall makes up a concavely crooked portion $R_2$ denting generally concavely from outside to inside. The boundaries between the convexly crooked portion $R_1$ and the concavely crooked portion $R_2$ in the bumper $B_2$ have clamping portions 3 in the main bumper body 1 and clamping portions 4 in the surface portion 2, wherein the upper and lower edges of the main bumper body 1 are clamped by the upper and lower edges of the surface portion 2 in such a manner that the latter ones embrace the former ones. In addition, the boundaries have joining portions 11a, 11b and 11c which each project from the main bumper body 1, the surface portion 2 and the back surface portion 10 respectively, wherein the main bumper body 1, the surface portion 2 and the back surface portion 10 have different type of resins and the joining portions 11a, 11b and 11c are integrally joined by means of bolts/nuts 12.

In the bumper $B_2$ of Example 2, the main bumper body 1 and the surface portion 2 both constituting the multi-layer marginal-wall region of the bumper $B_2$ are secured to each other by the clamping force on the basis of the difference (approximately 1.0%) between the molding shrinkage factor (approximately 0.8%) of the mixed glass reinforced ABS resin which has a relatively low molding shrinkage factor and constitutes the main bumper body 1 and the molding shrinkage factor (approximately 1.8%) of the olefinic elastomer resin which has a relatively large molding shrinkage factor and constitutes the surface portion 2, in such a manner that the clamping portions 3 of the main bumper body 1 are clamped by the clamping portions 4 of the surface portion 2 with the former one fitting the latter ones. In the same way, the main bumper body 1 and the back surface portion 10 are secured to each other by the clamping force on the basis of the difference (approximately 0.3%) between the molding shrinkage factor (approximately 0.8%) of the mixed glass reinforced ABS resin which has a relatively low molding shrinkage factor and constitutes the main bumper body 1 and the molding shrinkage factor (approximately 0.5%) of the glass-reinforced ABS resin which has a small molding shrinkage factor and constitutes the back surface portion 10, in such a manner that the back surface portion 10 is clamped by the main bumper body 1 with the former one fitting the latter one. In a preferred embodiment, the joining portions 11a, 11b and 11c each provided in the main bumper body 1, the surface portion 2, and the back surface portion 10 respectively are integrally joined by means of the bolts/nuts 12.

In Example 2, the main bumper body 1 and the back surface portion 10 are adhered to each other to some extent on the basis of the affinity between them. Because similar types of glass-reinforced ABS resins are used there. Therefore, in the same way as in Example 1, the bumper $B_2$ of Example 2 can be easily separated into two parts each of which has a different type of resin, i.e., the surface portion 2 and a combination of the main bumper body 1 and the back surface portion 10.

EXAMPLE 3

Figure 8:
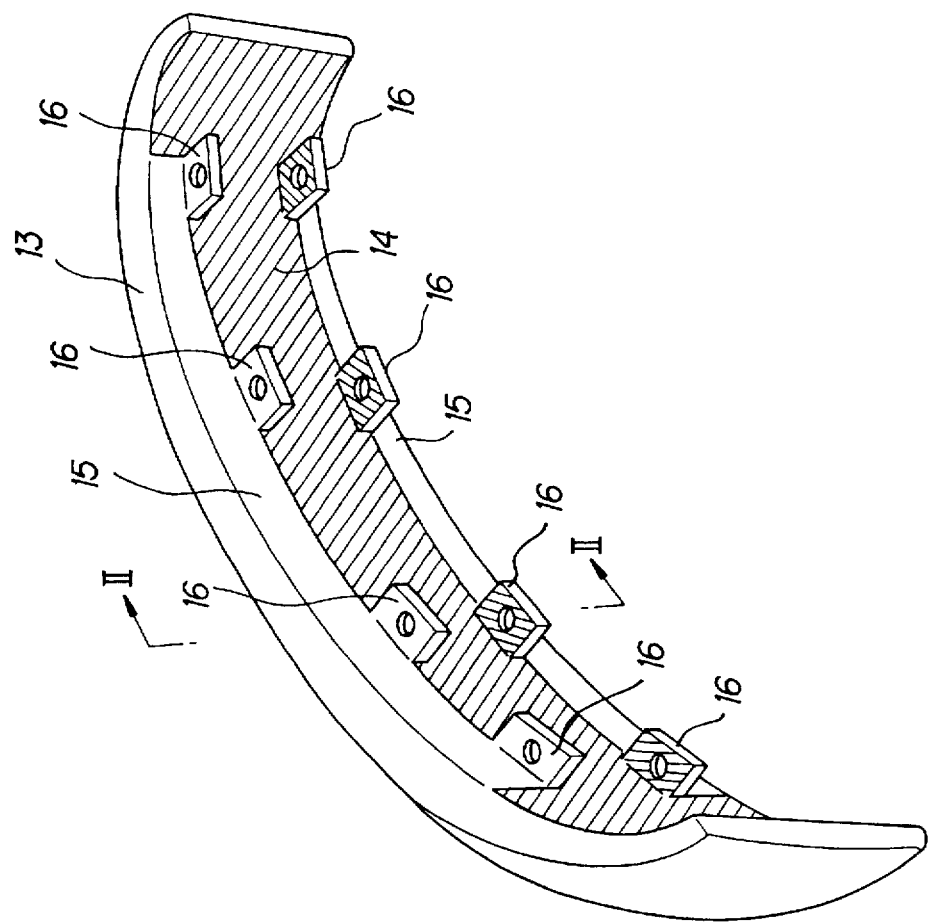
FIG. 8 is a perspective view of an automobile bumper which is a multi-layer, hollow-structure molded article in Example 3 of the present invention.
Figure 9:
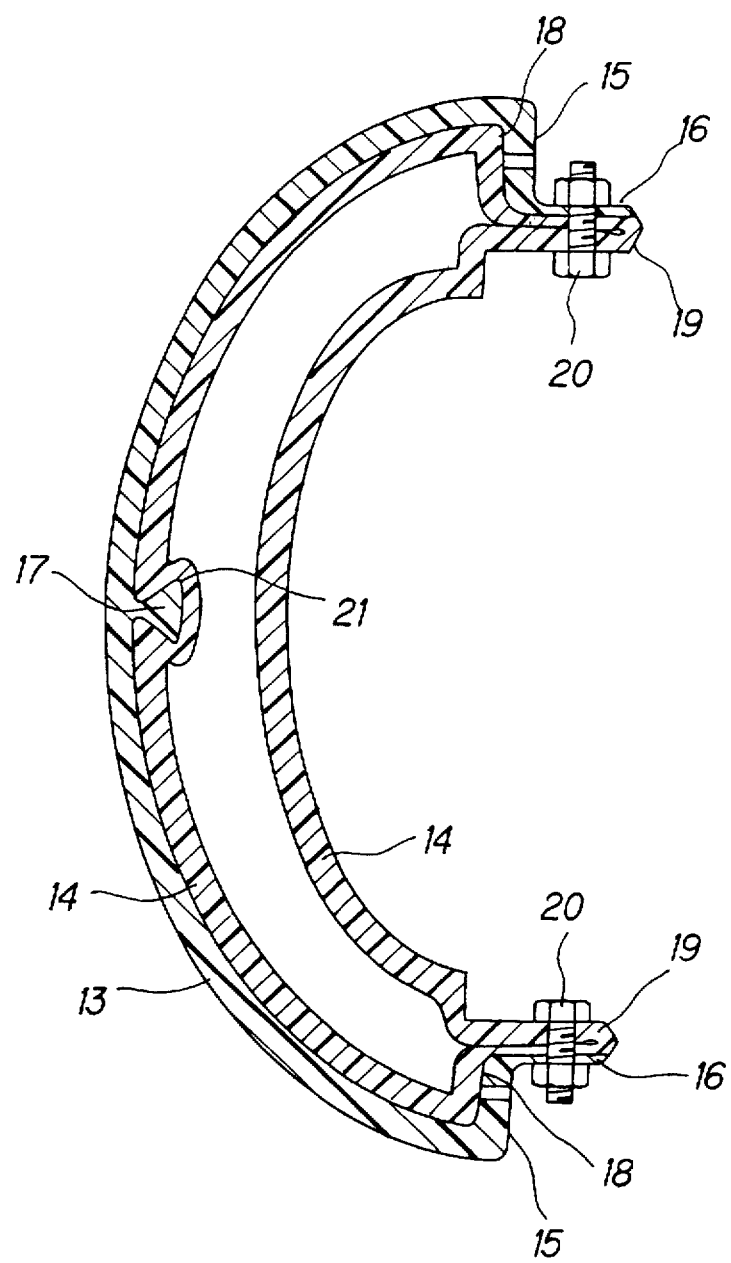
FIG. 9 is a sectional view taken along the line II-II in FIG. 8.

Referring to FIGS. 8 and 9, there is shown an automobile bumper which is a multi-layer, hollow-structure molded article in Example 3 of the present invention.

This automobile bumper basically consists of a fascia portion (surface layer) 13 which is formed by an injection molding technique or a vacuum forming technique using a thermoplastic, olefinic elastomer of a molding shrinkage factor of 1.8% and a main bumper body (hollow structure) 14 which is formed by a blow molding technique using a thermoplastic, glass-reinforced ABS resin of a molding shrinkage factor of 0.5% and is secured to the back surface of the fascia 13.

The fascia portion 13 mentioned above has upper and lower clamping portions 15 which are bent along upper and lower marginal edges thereof in a longitudinal direction in such a manner that the fascia portion 13 embraces the main bumper body 14 located at the back surface of the fascia portion 13. Each clamping portion has four marginal joining portions 16 which each project outward and are located at established intervals along the marginal edge of the clamping portion 15. In addition, the back surface (inner surface) of the fascia portion 13 has, generally at its center in a longitudinal direction, a convex locking portion 17 the section of which is generally in the shape of an inverse triangle and which projects outward, if it is required that the fascia portion 13 and the main bumper body 14 are strongly secured to each other. On the other hand, the main bumper body 14 has, along the upper and lower marginal edges thereof in a longitudinal direction, stepped portions 18 which are locked by the upper and lower clamping portions 15 formed along the upper and lower marginal edges of the fascia portion 13, whereby the clamping portions 15 of the fascia portion 13 and the stepped portions 18 of the main bumper body 14 are locked together. In addition, the fascia portion 13 and the main bumper body 14 are fittingly and strongly secured to each other by means of a clamping force resulting from the difference (1.3%) between the molding shrinkage factor (1.8%) of a thermoplastic olefinic elastomer constituting the fascia portion 13 and the molding shrinkage factor (0.5%) of a thermoplastic glass-reinforced ABS resin constituting the main bumper body 14. Furthermore, the main bumper body 14 has four joining portions 19 at the positions corresponding to the four marginal joining portions 16 which extend from the clamping portions 15 of the fascia portion 13, wherein the joining portions 19 project from the stepped portions 18. The marginal joining portions 16 and the joining portions 19 can be joined by means of bolts/nuts. In a preferred embodiment which provides stronger joining, the main bumper body 14 has a concave locking portion 21 like a groove at the position corresponding to the convex locking portion 17 the section of which is generally in the shape of an inverse triangle and which is formed generally at the center of the fascia portion 13 in a longitudinal direction and at the rear side of the fascia portion 13, wherein the concave locking portion 21 is a groove generally in the shape of an inverse triangle and fits the convex locking portion 17. Thus, the convex locking portion 17 of the fascia portion 13 and the concave locking portion 21 of the main bumper body 14 are fittingly secured to each other.

As is described above, in the automobile bumper of Example 3, the stepped portions 18 of the main bumper body (hollow structure) 14 are strongly clamped by the clamping portions 15 of the fascia portion (surface layer) 13 on the basis of the difference between the molding shrinkage factor of the resin for use in the main bumper body 14 and the molding shrinkage factor of the resin for use in the fascia portion 13. In addition, the marginal joining portions 16 of the fascia portion 13 are fixed to the joining portions 19 of the main bumper body 14 by means of bolts/nuts. Furthermore, because the convex locking portion 17 of the fascia portion 13 is locked to the concave locking portion 21 of the main bumper body 14 with the former one fitting the latter one, the fascia portion 13 and the main bumper body 14 are more strongly secured to each other without using such a means as an adhesive or fusing to the extent that the automobile bumper shows enough endurance in its application to an automobile.

EXAMPLE 4

Figure 10:
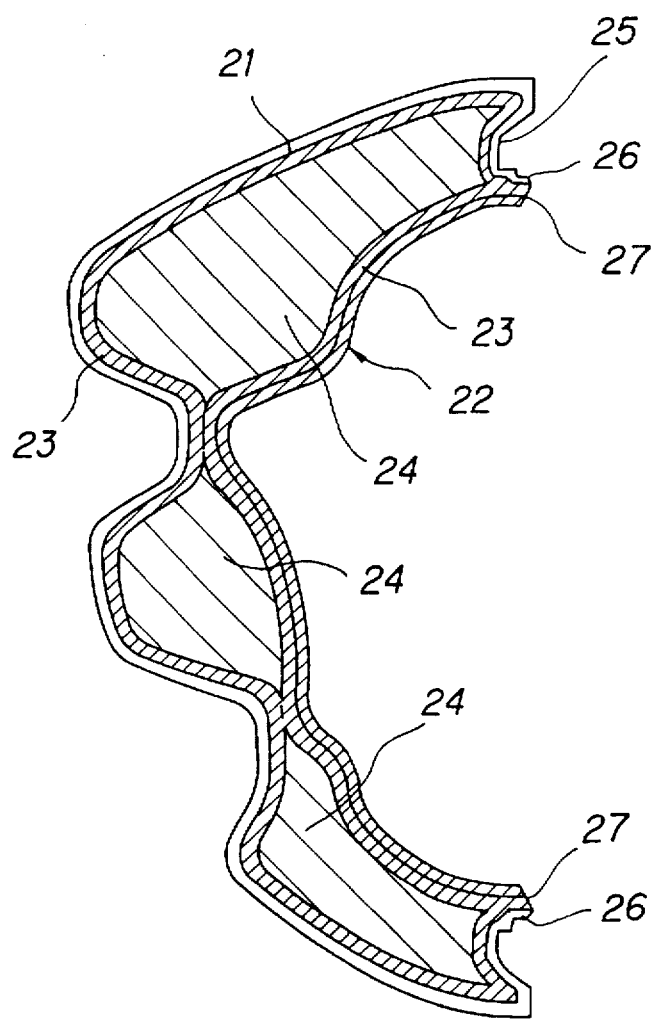
FIG. 10 is a sectional view of an automobile bumper which is a multi-layer blow-molded article in Example 4 of the present invention.

Referring to FIG. 10, there is shown a sectional view of an automobile bumper $B_1$ which is a multi-layer blow-molded article in Example 4 of the present invention. In this example, an outer layer 21 of a generally convex surface is made of a polymer-alloy resin (PA6+modified PPE) of a molding shrinkage factor of approximately 0.5%, and an outer layer 22 of a generally concave surface and an inner layer 23 are both made of a filler-reinforced PP resin of a molding shrinkage factor of approximately 1.5%. A foamed material 24 inside the bumper $B_1$ is made of a foamed PP resin based on the same type of PP resin as used in the inner layer 23, whereby the overall dimensional shrinkage factor of the molded article is maintained at approximately 0.4%. In this case, the volume of the foaming material 24 increases approximately 100-fold. The layer 21 made of the polymer-alloy resin (PA6+modified PPE) has clamping portions 25 extending from the generally convex surface to the generally concave surface. Furthermore, there are provided, in total, eight planar projecting portions 26 and 27 on the boundaries of layer 21 and the outer layer of the generally concave surface which is made of the filler-reinforced PP resin, wherein the planar projecting portions 26 and 27 project outward from the article and four of them are each joined by bolts/nuts.

By removing the bolts/nuts by which the planar projecting portions 26 and 27 provided on the concave surface of the article are joined together, the layer made of the polymer-alloy resin (PA6+modified PPE) and the layer containing the foamed material and made of the filler-reinforced PP resin may mechanically separate from each other without damaging. Thus, each separated layer can be ground and granulated separately to obtain a reprocessed resin. The article of Example 4 is molded using a mixture of the virgin resin and the reprocessed resin, wherein the mixture contains approximately 30% by weight of the reprocessed resin.

Industrial Applicability

In a multi-layer blow-molded article of the present invention, the layers are strongly secured to each other without separating under normal service conditions, the article provides advantages of multi-layer molded articles, and the layers and/or portions defined in a circumferential direction, both of which have diverse resins, easily separate from each other in recycling and reuse. Therefore, when the multi-layer blow-molded article of the present invention is used for large industrial parts, e.g., automobile bumpers or automobile fuel tanks, household containers, e.g., for mayonnaise or ketchup, and the like, the article can be enhanced its commercial value and can be recycled or reused on an economically feasible basis after use. In addition, environmental pollution resulting from the disposal of molded synthetic-resin articles can be prevented.

I claim:

1. A multi-layer blow-molded article wherein the layers are formed of diverse types of thermoplastic resins each having a different molding shrinkage factor and wherein, in a multi-layer marginal-wall region of the blow-molded article formed of a plurality of layers progressing from outer to inner layers, a more outer layer is formed of a resin having a higher molding shrinkage factor than that of a more inner layer at a convexly crooked portion where the multi-layer marginal-wall region is projected generally convexly from inside to outside, and a more outer layer is formed of a resin having a lower molding shrinkage factor than that of a more inner layer at a concavely crooked portion wherein the multi-layer marginal-wall region is dented generally concavely from outside to inside, the layers of the entire molded article being fittingly secured to each other, without adhesive by means of a clamping force resulting from the difference in molding shrinkage factors of the resins forming the layers defined in a circumferential direction in said multi-layer marginal-wall region.

2. A multi-layer blow-molded article according to claim 1 wherein a marginal wall of the hollow molded article comprises, in a circumferential direction, a plurality of regions which are different in at least one of the types of resin, the number of layers and the thickness of a layer.

3. A multi-layer blow-molded article according to claim 1 wherein the layers are not adhered to each other.

4. A multi-layered blow-molded article according to claim 1, wherein the convexly crooked portion the concavely crooked portion in the multi-layer marginal-wall region comprise a clamping portion which is so formed that any one of said more outer layers embraces any one of said more inner layers in the convexly crooked portion and that any one of said more inner layers embraces any one of said more outer layers in the concavely crooked portion.

5. A multi-layer blow-molded article according to claim 1, wherein joining portions extended from the regions of diverse resins and to be joined with each other are formed at the boundaries between the regions of diverse resins formed in at least the outermost layer of the hollow molded article, the joining portions being fixed by joining means.

6. A multi-layer blow-molded article according to claim 5 wherein the joining means is a joining part comprising a bolt and a nut or a clip, or a joining structure comprising a fastener or a zipper secured to or formed in the joining portions.

7. A multi-layer blow-molded article wherein a multi-layer blow molded hollow-structure article is formed by combining a surface layer which is formed by injection molding or vacuum forming and which occupies at least 50% in area of the entire surface of the molded article with a hollow structure which is formed by blow molding and is integrally joined to the back of the surface layer, the surface layer being molded of a resin having a higher molding shrinkage factor than that of a resin forming the hollow structure, the surface layer having a clamping portion for embracing and clamping said hollow structure, the surface layer being secured without adhesive to the hollow structure on the basis of the difference in molding shrinkage factor between the resin forming the surface layer and the resin forming the hollow structure.

8. A multi-layer blow-molded article according to claim 7 wherein the surface layer is secured to the hollow structure by joining a plurality of marginal joining portions extending from the clamping portions of the surface layer and corresponding stepped portions of the hollow structure with a joining means.

9. A multi-layer blow-molded article according to claim 7 wherein the surface layer has a convex locking portion projected from the inner surface thereof and the hollow structure has a concave locking portion formed therein at the position corresponding to the convex locking portion of the surface layer, the surface layer being secured to the hollow structure by locking said convex locking portion to the concave locking portion.

10. A multi-layer blow-molded article formed of a hollow molded article filled with a foaming resin wherein the hollow molded article is formed of layers of diverse thermoplastic resins having different molding shrinkage factors without being adhered to each other, a more outer layer being formed of a resin which has a molding shrinkage factor lower than that of a resin of a more inner layers wherein the overall molding shrinkage factors inherent in the materials of said molded article after said molded article has been filled with foaming resin is lower than the molding shrinkage factors inherent in resins constituting the layers of said molded article without the foaming resin filled therein.

11. A multi-layer blow-molded article according to claim 10 wherein the materials of the inner layer of the hollow molded article and those of the foaming resin to be filled in the hollow molded article are substantially the same.

\* \* \* \* \*